United States Patent Office 3,427,137
Patented Feb. 11, 1969

3,427,137
PHOSPHONITRILE POLYMER
Charles D. Schmulbach, Murphysboro, Ill., assignor to Research Corporation, New York, N.Y., a non-profit corporation of New York
No Drawing. Filed Oct. 26, 1965, Ser. No. 505,245
U.S. Cl. 23—357                                3 Claims
Int. Cl. C01b 25/00

ABSTRACT OF THE DISCLOSURE

Chlorinated phosphonitrile polymers having the empirical formula $Cl_5P_3N_3$ are prepared by reacting hydrogen azide with phosphorus trichloride at temperatures below about $-50°$ C. in the presence of ultraviolet light to form an intermediate composition having the empirical formula $Cl_9P_5N_8$ and then heating the intermediate composition above 140° C. The resultant polymers are stable to heat and hydrolysis and are useful in fire proofing fabrics or as protective coatings.

---

This invention relates to inorganic polymers of high molecular weight and low chemical activity. In one specific aspect, it relates to a novel chlorine-containing phosphonitrile polymer and to methods for making such polymers.

I have discovered that hydrogen azide can be reacted with phosphorus trichloride in the presence of ultraviolet light to form a chlorine-phosphorus-nitrogen-containing composition, which, on heating, forms the polymeric phosphonitrile composition of the present invention. The polymer is obtained as a white fibrous material virtually unaffected by boiling in concentrated aqueous alkali despite its high chlorine content. Because of its stability to heat and hydrolysis, and its high chlorine content, the polymer composition of the present invention is useful as a fire proofing compound for fabrics or as a protective coating on other surfaces.

The present invention is the process for making a phosphonitrile polymer having the empirical formula $Cl_5P_3N_3$ which comprises reacting hydrogen azide with phosphorus trichloride in the presence of ultraviolet light to form an intermediate composition having the empirical formula $Cl_9P_5N_8$ and heating the intermediate composition to above 140° C. to form the phosphonitrile polymer. The present invention also includes the intermediate composition and the polymeric composition resulting from the process.

The process of the present invention may be illustrated by means of the following chemical equations:

$$5PCl_3 + 6HN_3 \xrightarrow{u\text{-}v.} Cl_9P_5N_8 + 6HCl + 5N_2$$
$$Cl_9P_5N_8 \xrightarrow{140°\,C.} Cl_5P_3N_3 + (Cl_2PN)_n + N_2$$

In order to obtain better yields of $Cl_9P_5N_8$ and to minimize the amount of by-product ammonium chloride formed, the reaction of hydrogen azide with phosphorus trichloride is effected at low temperatures. Preferably, the reaction system is kept below $-50°$ C. Dry Ice-acetone mixtures are most commonly employed in the cooling baths.

The exact structure of the intermediate $Cl_9P_5N_8$ is not known. Infrared data, molecular weight measurements and elemental analysis are consistent with the linear structure

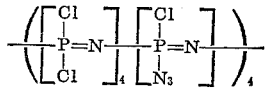

The precise nature of the end groups has not yet been determined. Phosphorus nmr spectra show two bands at $+8.0$ (weak) and $+17.1$ p.p.m. (strong) (relative to 85% $H_3PO_4$) with relative areas within that required for a linear polymer of molecular weight 2100. The composition resembles other linear compounds of phosphorus, nitrogen and chlorine but is characterized by the presence in the structure of the azide group.

On heating to temperatures above about 140° C. the intermediate composition of the formula $Cl_9P_5N_8$ decomposes liberating nitrogen to form the phosphonitrile polymer of the present invention having the formula $Cl_5P_3N_3$. Also formed are associated dichlorophosphonitriles of the general formula $(Cl_2PN)_n$ wherein $n$ is mostly 3 or 4, i.e., the trimer or tetramer.

The exact structure of $Cl_5P_3N_3$ is not known but its lack of reactivity, elemental analysis and method of preparation suggest that it is a highly cross-linked chlorophosphonitrile polymer. The cross-linking is attributed to randomly located N—N linkages probably arising from the presence of azido groups in the intermediate $Cl_9P_5N_8$ composition. It is to be understood that these remarks concerning the structure of the compositions of the present invention are included only for the purpose of illustrating the invention and are not intended as limiting the compositions of the present invention to any particular structural modification falling within its scope.

As stated above, the polymeric composition having the empirical formula $Cl_5P_3N_3$ of the present invention is useful as a fire proofing composition for fabrics or as a protective coating on various surfaces such as wood, metal, plastic, etc. In using this composition for such purposes, it may be more convenient to impregnate or coat the article to be protected with the intermediate composition $Cl_9P_5N_8$, for example, in benzene solution. After evaporation of the solvent, heating of the treated article to temperatures above about 140° C. decomposes the intermediate composition to form the $Cl_5P_3N_3$ protective composition in situ.

Since the reactants and intermediate composition used in the practice of the present invention are moisture sensitive, appropriate precautions should be taken to protect them from exposure to air or moisture. All glassware used in the experiments described below was baked for at least thirty minutes in an oven at 110° C. rapidly assembled, and flushed with a stream of dry nitrogen. The nitrogen stream was continued throughout the course of the reaction. The transfer of moisture sensitive liquids was effected either in a polyethylene inert-atmosphere "glove bag" under nitrogen or by pipetting and rapidly transferring the pipet contents to the nitrogen-flushed reaction apparatus in the open air. In the latter instances the pipet was always first flushed and filled with nitrogen. The recovery of products was also accomplished with minimum exposure to the atmosphere. Vacuum filtrations were carried out either in the inert-atmosphere bag or under an inverted funnel through which a liberal stream of dry nitrogen was passed. Materials collected were stored in a desiccator over phosphorus pentoxide.

Ultraviolet light was provided by a Hanovia type 612C quartz high-pressure mercury-vapor lamp measuring 120 x 18 millimeters, with an arc length of 40 millimeters. Maximum radiation intensity of this lamp is at 5461 A. wavelength, with lower intensities at wavelengths extending to well below the 2000 A. region of the spectrum. The lamp was supplied with a Hanovia "Multi-watt Stabilizer" ballast, capable of producing lamp output wattages of 100–400 w., depending upon the capacitance of the lamp circuit.

Owing to the toxicity and the explosion hazards of hydrogen azide, all reactions involving this material were conducted with appropriate safety precautions. The entire apparatus was arranged so that hydrogen azide could be generated, reactions could be carried out, and excesses of hydrogen azide could be destroyed completely under protection of the shielding described. Furthermore, reaction temperatures could be controlled by circulation of a coolant through a constant temperature bath which was maintained externally. Samples of the effluent gases from the reactions could be taken conveniently for infrared spectra under protection of the shield. The shielded sections of the apparatus were contained in an exhaust hood whose single open side was completely closed with a removable section of three-fourths inch plywood. An eight by fourteen inch observation hole was cut in the plywood shield, and a laminated safety glass shield was placed behind the hole. Stopcock manipulations could be effected by means of wooden shafts through one-half inch holes in the shield.

In addition, the Dewar flask surrounding the reaction vessel was fitted with a toluene thermometer ($-95$–$+30°$ C.) that was placed so as to be visible through the observation window in the shield. The hydrogen azide drying column was wrapped entirely with heating tape from the ground joint of the generator to the ground joint of the reaction vessel. All connections between the various glass pieces of the apparatus were made with Tygon or polyethylene tubing.

The photochemical reaction of hydrogen azide and phosphorus trichloride was accomplished using the apparatus and techniques described above. In a typical reaction the hydrogen azide generator was charged with ten grams of sodium azide (0.15 mole), and 250 milliliters of phosphorus trichloride was introduced to the reaction vessel. The reaction flask was cooled using acetone in the circulatory system and a Dry Ice-acetone mixture circa $-78°$ C. as the external constant temperature bath.

Approximately one hour was required for the generation of hydrogen azide and its condensation in the reaction vessel. When the ultraviolet source was activated, gaseous evolution from the reaction solution was immediate. Photolysis with 100 to 140 watts of radiant power was continued for a period of about three hours. During this time, the circulating coolant maintained an average temperature of $-67°$ C. in the Dawar flask surrounding the reaction vessel. As photolysis was allowed to proceed, a small quantity of solid material formed at the surface of the quartz lamp jacket. Most of this solid adhered to the quartz surface and decreased the amount of effective radiation, particularly toward the end of the photolysis period.

Prior to activating the ultraviolet radiation source, and at one hour intervals throughout the radiation period, infrared spectra were taken of the gases which were expelled from the reaction solution and carried off in the slow nitrogen stream. A high concentration of hydrogen azide vapor, as evidenced by the absorption band at 2141 cm.$^{-1}$, was found to be present in all samples examined, but the peak height diminished toward the end of the reaction. An extremely high concentration of hydrogen chloride, determined by its multiplet structure centered about 2906 cm.$^{-1}$, was also observed and seen to diminish as photolysis proceeded. Essentially no hydrogen chloride band was observed in the spectrum of samples taken before photolysis was begun.

When photolysis was stopped, the reaction mixture was allowed to warm to room temperature and was filtered to remove traces of solid material. The solid adhering to the lamp jacket was washed thoroughly with benzene, scraped from the lamp jacket, and combined with that filtered from the reaction mixture. The combined solid was washed again with benzene and dried in vacuo. Except for small amounts of insoluble components, the solid dissolved instantly in water without any detectable evolution of gas. The resultant aqueous solution was neutral to litmus, and the principal constituent of the solution was established as ammonium chloride through qualitative identification of the ions.

The benzene filtrate containing the reaction products was evaporated at reduced pressure, and a small quantity of a slightly yellow, viscous liquid remained. This material was again dissolved in benzene and then separated by the addition of petroleum ether. The immiscible solvent layer was retained in a separatory funnel while the viscous liquid was removed, and the extraction procedure repeated twice to rid the material of any phosphorus trichloride contaminant. Finally, traces of benzene were removed by placing the reaction product under reduced pressure for twenty-four hours.

The infrared spectrum of the viscous liquid product showed a broad, intense absorption centered at 1239 cm.$^{-1}$ with a shoulder at 1295 cm.$^{-1}$, the region of absorption for the P—N link in phosphonitrile polymers. In addition, there is a sharp band at 2157 cm.$^{-1}$ which was assigned to an asymmetric azide vibration. No other well-defined peaks were present. Values for the molecular weight of the product, determined cryoscopically in benzene, were 2200 and 2010. A composition corresponding to $P_5N_8Cl_9$ was indicated by the following elemental analysis:

*Analysis.*—Calcd. for $N_8Cl_9P_5$: N, 19.12; Cl, 54.45; P, 26.43. Found: N, 1.82; Cl, 54.23; P, 26.03.

The above reaction was repeated several times under the same conditions as well as under conditions of higher radiation intensity (200 and 300 watts). In addition, an experiment was run in which a heptane slush ($-90°$ C.) was used as the constant temperature bath so that the circulating coolant maintained an average temperature of $-78°$ C. in the Dewar flask surrounding the reaction vessel. Observations were essentially the same in all cases, and the same products were isolated from all of the reactions. The yields of ammonium chloride were always less than 0.2 gram, and the yields of the composition of the formula $Cl_9P_5N_8$ ranged from three to seven grams.

A 0.32 gram sample of the composition of the formula $Cl_9P_5N_8$ was decomposed by heating above 140° C. under vacuum. The reaction vessel instantly filled with a white smoke which quickly deposited on the cold walls of the vessel. A total of 0.09 gram of a semisolid material was recovered from the walls of the reaction vessel. Fractional sublimation of this material resulted in its separation into dichlorophosphonitrile trimer (0.03 gram) and tetramer (0.02 gram). These compounds were identified by comparison of their infrared spectra with the spectra of authentic samples and their melting points (113–114° C. and 121–123° C., respectively) agree with those of the authentic samples and with published data. Approximately 0.03 grams of a semi-solid material did not sublime and was not further characterized.

In addition to the material recovered from the walls following pyrolysis, a white, fibrous material remained in the reaction vessel. This material was scraped from the flask, extracted with benzene to remove any remaining soluble materials and dried under vacuum. The quantity of product recovered was 0.14 gram.

*Analysis.*—Calcd. for $N_3Cl_5P_3$: N, 13.46; Cl, 56.78; P, 29.76. Found: N, 13.62; Cl, 56.78; P, 29.67.

The product was found to be insoluble in polar and non-polar solvents, and appeared unaffected by boiling for twenty minutes in concentrated aqueous alkali, with the exception of some slight shrinkage of its fibrous mass.

I claim:
1. A process for making phosphonitrile polymers having the empirical formula $Cl_5P_3N_3$ which comprises reacting hydrogen azide with phosphorus trichloride at temperatures below about $-50°$ in the presence of ultraviolet light to form an intermediate composition having the empirical formula $Cl_9P_5N_8$ and heating the intermediate composition to above $140°$ C. to form the phosphonitrile polymer.
2. Chlorinated phosphonitrile compositions having the empirical formula $Cl_9P_5N_8$.
3. Polymeric chlorinated phosphonitriles having the empirical formula $Cl_5P_3N_3$.

References Cited

UNITED STATES PATENTS

| | | | |
|---|---|---|---|
| 2,782,133 | 2/1957 | Vallette | 23—357 |
| 2,980,495 | 4/1961 | Rätz et al. | 23—357 |

OSCAR R. VERTIZ, *Primary Examiner.*

H. S. MILLER, *Assistant Examiner.*